United States Patent
Pike et al.

(10) Patent No.: US 10,286,862 B2
(45) Date of Patent: May 14, 2019

(54) CHARGING INTEGRATION SYSTEM FOR A VEHICLE

(71) Applicant: Adient Luxembourg Holding S.à.r.l., Luxembourg (LU)

(72) Inventors: Mason Pike, Howell, MI (US); Ken Clark, Howell, MI (US); James Hollowood, Saline, MI (US); Jeff Laho, Canton, MI (US); Mark Milner, White Lake, MI (US)

(73) Assignee: Adient Luxembourg Holding S.à.r.l., Luxembourg (LU)

( * ) Notice: Subject to any disclaimer, the term of this patent is extended or adjusted under 35 U.S.C. 154(b) by 158 days.

(21) Appl. No.: 15/037,570

(22) PCT Filed: Nov. 18, 2014

(86) PCT No.: PCT/US2014/066051
§ 371 (c)(1),
(2) Date: May 18, 2016

(87) PCT Pub. No.: WO2015/077198
PCT Pub. Date: May 28, 2015

(65) Prior Publication Data
US 2016/0276865 A1  Sep. 22, 2016

Related U.S. Application Data

(60) Provisional application No. 61/907,816, filed on Nov. 22, 2013, provisional application No. 61/909,658, filed on Nov. 27, 2013.

(51) Int. Cl.
*H02J 7/00* (2006.01)
*B60R 16/03* (2006.01)
(Continued)

(52) U.S. Cl.
CPC ............... *B60R 16/03* (2013.01); *B60N 2/02* (2013.01); *B60N 2/90* (2018.02); *B60N 3/101* (2013.01);
(Continued)

(58) Field of Classification Search
USPC .......................................................... 320/108
See application file for complete search history.

(56) References Cited

U.S. PATENT DOCUMENTS 6,135,549 A  10/2000  Demick et al.
7,728,551 B2  6/2010  Reed et al.
(Continued)

FOREIGN PATENT DOCUMENTS

CN  202 341 426 U  7/2012
CN  102 84 2934 A  12/2012
(Continued)

OTHER PUBLICATIONS

Chinese Office Action dated Mar. 30, 2017.
Supplemental European Search Report dated Sep. 23, 2016.

*Primary Examiner* — Robert J Grant
(74) *Attorney, Agent, or Firm* — McGlew and Tuttle, P.C.

(57) ABSTRACT

A charging integration system for a vehicle. The charging integration system includes a seat structure, a charging system carrier and a charging station structure. The charging system carrier is pivotably connected to the seat structure. The charging station structure is movably connected to the charging system carrier. The charging integration system allows one or more devices to be charged wirelessly or by a physical connector that connects the one or more devices to the charging station structure.

19 Claims, 9 Drawing Sheets

(51) Int. Cl.
*H02J 50/10* (2016.01)
*H02J 50/70* (2016.01)
*B60N 2/90* (2018.01)
*B60R 11/02* (2006.01)
*H02J 7/02* (2016.01)
*H02J 17/00* (2006.01)
*B60N 2/02* (2006.01)
*B60N 3/10* (2006.01)
*H02J 7/14* (2006.01)

(52) U.S. Cl.
CPC .......... *B60R 11/02* (2013.01); *B60R 11/0241* (2013.01); *B60R 11/0252* (2013.01); *H02J 7/0044* (2013.01); *H02J 7/0047* (2013.01); *H02J 7/025* (2013.01); *H02J 7/14* (2013.01); *H02J 17/00* (2013.01); *H02J 50/10* (2016.02); *H02J 50/70* (2016.02); *H02J 2007/0049* (2013.01)

(56) References Cited

U.S. PATENT DOCUMENTS

| | | |
|---|---|---|
| 7,770,966 B2 | 8/2010 | Johnson |
| 8,167,366 B2 | 5/2012 | Charpentier et al. |
| 8,310,200 B2 | 11/2012 | Matouka et al. |
| 2008/0079388 A1* | 4/2008 | Sarnowsky ........... H02J 7/0042 320/103 |
| 2008/0265835 A1 | 10/2008 | Reed et al. |
| 2010/0264871 A1 | 10/2010 | Matouka et al. |
| 2011/0018498 A1 | 1/2011 | Soar |
| 2012/0062175 A1* | 3/2012 | Miller ..................... H02J 50/40 320/108 |
| 2012/0091948 A1 | 4/2012 | Shinde et al. |
| 2012/0126746 A1 | 5/2012 | Yang |
| 2012/0313576 A1 | 12/2012 | Peiker |
| 2013/0038279 A1* | 2/2013 | Seyerle ................. B60R 16/033 320/108 |
| 2013/0038280 A1 | 2/2013 | Boundy et al. |
| 2013/0093220 A1* | 4/2013 | Pajic ........................ A47C 7/70 297/163 |
| 2013/0093387 A1 | 4/2013 | Vassilieff et al. |
| 2013/0106346 A1 | 5/2013 | Salter et al. |
| 2013/0251937 A1 | 9/2013 | Sitti et al. |
| 2013/0285601 A1* | 10/2013 | Sookprasong .......... H02J 50/10 320/108 |

FOREIGN PATENT DOCUMENTS

| | | |
|---|---|---|
| CN | 202 874 524 U | 4/2013 |
| CN | 203 246 351 U | 10/2013 |
| DE | 10 2005 058636 A1 | 6/2007 |
| FR | 29 71 877 A1 | 8/2012 |
| WO | 2010/080739 A2 | 7/2010 |
| WO | 2012/158800 A2 | 11/2012 |
| WO | 2013/030648 A1 | 3/2013 |
| WO | 2013/055671 A1 | 4/2013 |

* cited by examiner

US 10,286,862 B2

CHARGING INTEGRATION SYSTEM FOR A VEHICLE

CROSS REFERENCE TO RELATED APPLICATIONS

This application is a U.S. National Phase Application of International Application PCT/US2014/066051 filed Nov. 18, 2014 and claims the benefit of priority under 35 U.S.C. § 119 and § 120 of U.S. provisional application 61/907,816 filed Nov. 22, 2013 and U.S. provisional application 61/909,658 filed Nov. 27, 2013, the entire contents of each application are incorporated herein by reference.

FIELD OF THE INVENTION

The invention relates to a charging integration system for a vehicle, in particular a wireless charging integration system for a vehicle.

BACKGROUND OF THE INVENTION

Current wireless technology does not allow for a device to be interacted with while it is charging as the wireless power transmission range is very short. To mitigate this, a method of deploying and containing transmitter coils and a printed circuit board (PCB) is needed for second row occupants to fully utilize the technology in an automotive environment.

US 2013/0106346 A1 discloses a vehicle wireless charging system that senses an object that prohibits wireless charging when an object is sensed. The system includes a charger region and a wireless charger for generating an electromagnetic field in the charger region to charge a rechargeable device. The system also includes a proximity sensor located proximate the charger region to sense the presence of an object. A controller controls the wireless charger to prohibit charging when the object is sensed.

U.S. Pat. No. 8,310,200 B2, and corresponding U.S. patent publication US 2010/264871 A1, discloses an apparatus for wirelessly charging a portable electronic device. An embodiment of the apparatus includes an inductive charger with a housing having an internal compartment, wherein the internal compartment has a first lateral dimension, and a primary coil disposed within the internal compartment. The primary coil has a second lateral dimension that is less than the first lateral dimension, and the primary coil is slidably engaged within the internal compartment.

U.S. Pat. No. 7,728,551 B2, and corresponding U.S. patent publication US 2008/265835 A1, discloses a wireless power transfer system for charging an electronic device having a secondary coil that includes a primary controller disposed on a class B surface of a vehicle. A primary coil is electrically connected to the primary controller. The primary coil is disposed remotely from the primary controller on a class A surface of the vehicle. A protective shield is disposed on the primary coil to secure the primary coil to the class A surface and indicia indicating an alignment of the secondary coil of the electronic device is disposed on the protective shield.

US 2013/093387 A1 discloses an inductive charging device for a portable apparatus for an automobile vehicle including at least one charging antenna for inductive charging of the WPC type having a cut-out at its center together with one communication antenna for near-field communication of the NFC type, situated around the at least one charging antenna, along the sides of the charging device and including at least one winding, the device being such that: on at least one of the sides of the charging device, the communication antenna forms at least one loop having at least one crossing point on its base, the communication antenna having at least an upper part surrounding the center of the cut-out of the charging antenna, the upper part of the loop of the communication antenna surrounding the center of the cut-out has at least one winding.

WO 13/030648 A1 discloses a mobile terminal charging system that includes: a wireless power supply device that is provided inside a vehicle cabin and that is configured to perform a charging operation for charging a mobile terminal; and a control device that controls the wireless power supply device, wherein, when wireless communication is carried out between an in-vehicle communication device and an electronic key inside the vehicle cabin in a situation that the charging operation is being performed by the wireless power supply device, the control device temporarily suppresses the charging operation performed by the wireless power supply device.

US 2013/038279 A1 discloses a vehicle having a wireless battery charger that is mounted within the vehicle, and an electrostatic shield for reducing electromagnetic interference radiated by the wireless battery charger.

US 2013/038280 A discloses methods, system and apparatus for securing a rechargeable electronic device with respect to a surface of a wireless battery charging apparatus of a vehicle.

CN 102 84 2934 A discloses a vehicle-mounted wireless charging device. The vehicle-mounted wireless charging device comprises a base fixed on an automobile body, wherein a first printed circuit board (PCB) and a transmitting coil are arranged in the base; the transmitting coil is connected with an automobile power supply through the first PCB; an upper seat is arranged above the base; a second PCB and a receiving coil are arranged in the upper seat; the receiving coil is connected with a universal serial bus (USB) interface circuit through the second PCB; and the first PCB provides variable current to the transmitting coil, so that the receiving coil generates induced current, charging voltage is provided for the USB interface under the action of the second PCB and a mobile phone can be charged by being connected to the USB interface through a data line. The vehicle-mounted wireless charging device acquires suitable charging voltage through an electromagnetic induction principle.

US 2012/313576 A1 discloses a charging arrangement for a vehicle comprising an inductively chargeable mobile electronic appliance consisting of a multiplicity of different, inductively chargeable, mobile electronic appliances, having a secondary coil, charging electronics and a rechargeable battery and a charging device having a primary coil and a charging surface which is associated with the primary coil and above which the mobile electronic appliance can be placed down for charging. In this case, the primary coil can be fixed in a first primary position and in at least one second primary position on a primary plane relative to the charging surface, with the primary coil being fixed in the chosen primary position independently of shaking, vibrations or centrifugal forces acting on the charging arrangement, and independently of the presence of the mobile electronic appliance.

WO 12/158800 A2 discloses a vehicle wireless charging system that includes a power transmission module configured to transfer energy to a power receiver module of a portable electronic device. The vehicle wireless charging system also includes a platform configured to contact the portable electronic device, and to facilitate translation of the portable electronic device relative to the power transmission module along a direction of travel. The vehicle wireless charging system further includes a controller communicatively coupled to the power transmission module. The controller is configured to detect alignment between the power transmission module and the power receiver module, and to output a signal indicative of the detected alignment.

FR 29 71 877 A1 discloses a device that has a transmission unit including a communications module to detect a portable electrical appliance in a charging area. A transmitter module transmits electromagnetic waves in the area to charge a battery of the appliance. A prevention module receives information regarding presence of the appliance in the area and information regarding occurrence of an event indicative of a decision by a user to leave a vehicle, and controls a signaling unit to prevent the user from forgetting the appliance in the area when the information are received together.

CN 202 341 426 U discloses a seat with a wireless charging function. The seat with the wireless charging function comprises a seat body, a wireless charging transmitter module and a wireless charging receiving module; the wireless charging transmitter module is arranged in the seat body; the wireless charging receiving module is arranged on an electronic product to be charged; and the wireless charging transmitter module is connected with the wireless charging receiving module.

US 2012/126746 A1 discloses a wireless charging system that includes a charger and an electronic device. The charger includes a power input port including two input terminals for connecting to a power source and a power output port including two first metal sheets respectively connected to the two input terminals. The electronic device includes a power input port including two second metal sheets, a voltage conversion circuit connected to the two second metal sheets, a rectifier and filter circuit, and a battery. When the power output port of the charger is close to and faces the power input port of the electronic device. The two first metal sheets and the two second metal sheets form two capacitors, the power source provides power to the electronic device via the two capacitors and charges the battery after the power is processed by the voltage conversion circuit and the rectifier and filter circuit.

SUMMARY OF THE INVENTION

It is an object of the invention to provide a device for deploying and containing a wireless charging system for occupants of a vehicle so that users are provided with a designated charging space for mobile devices so that users can fully utilize wireless technology in an automotive environment. The wireless charging system provides an interface for various devices to be charged, either wirelessly or with a physical connection, such as a wired connection. The charging space is particularly provided in a second row of the vehicle, but may be provided in a third row of the vehicle or in a front row passenger's seat.

The present invention includes a system that is employed to dock a multitude of mobile devices ranging from tablets to smartphones while securing them to a multi-layered wireless charging integration system. The wireless charging integration system can be in the form of a docking station or tray that can secure and protect both a smartphone and tablet simultaneously, and be docked to the second row of the vehicle via a fold out docking tray. The tray can fold out from a flip-up cushion to improve the viewing angle of the devices mounted to the tray. By solving issues relating to electromagnetic compatibility (EMC), and heat dissipation within a seat, the present invention allows for a safe and EMC regulation conformant method to create a wireless charging integration system for vehicle seating assemblies. The system itself is able to display mobile device wireless charging status via visual or haptic indicators. In order for proper orientation of the devices over the transmitter coils a visual indicator is provided for proper device placement. Orientation is denoted via the shape of the rectangular regions as a smart phone or tablet. It is assumed that no one would place their device upside down on the charging region, however an arrow or text could be used to indicate which side is up, or in the case of the tablet outline shown in the first picture, which way to lay the tablet in a horizontal or landscape position.

Power is supplied to the coils and supporting electronic circuitry via 12 Volt DC supply from the vehicle battery via a harness that runs through the seat from the battery. There may be a DC to DC converter needed to power the wireless charging support circuitry as well as filtering to ensure proper functionality of the coils.

The wireless charging integration system may be in the form of a flip up tray or mobile device docking armature that employs five layers each with a particular function, listed below in descending order from primary surface:
1) A high friction anti-slip layer or coating to prevent movement of the device(s) in the X/Y direction to maintain proper orientation above charging coils;
2) Plastic electronics housing and device retention clips or recessed cavity to prevent movement of devices in the Z-direction and secure them to the fold out tray or armature;
3) The transmitter coils, required drive circuitry and battery to transfer wireless power to a mobile device;
4) A layer containing Ferrite to prevent metallic losses in seat frame assembly;
5) Thermal mitigation layer which can employ either passive or active cooling via heatsinks to remove heat produced by the transmitter coils. The heatsinks may be located behind the charging coils, specifically behind the shielding (ferrite) layer or printed circuit board if they are integrated into the printed circuit board. The ferrite layer itself could be perforated to allow airflow through it and cooling. The ferrite layer is then attached to the heatsink to allow conductive heat transfer to the heatsink, which is then cooled by convective cooling via airflow, either passively or actively by fans.

The main functionalities of the tray are to improve mobile device viewing angle, secure mobile devices, and be able to be stowed away when not in use. This type of functionality in the second row is achieved via a flip-up cushion. The tray (when presented after folding the cushion forward) can slide along a rail or track to adjust vertical viewing height of devices mounted to the surface. In addition the tray can fold up from the cushion in a pivot. Also the tray in its upright and deployed position can swivel from side to side to improve the viewing angle for particular occupants.

Additional features of the present invention include universal serial bus (USB) powered ports for devices that do not support wireless charging. USB ports may not be connected to the coils as the USB ports may require separate circuitry, and may be separately integrated into the face of the same plastic housing that retain the charging coils. The USB ports are on the A-surface, or the region that the occupant can see and interact with. The coils themselves are not considered A-surface electronics, and the coils may be hidden behind A-surface plastics in all scenarios. The USB ports can be integrated into the 3rd layer on the side of the flip up armature, on a surface protruding through the anti-slip high friction layer, or integrated into the base just below the tray. With electromagnetic interference (EMI) mitigation techniques, specifically shielding and improved grounding, a seat integrated with a wireless charging integration system can have reduced electromagnetic interference with other electronic systems within a vehicle. The system can be grounded using the vehicle ground. The improved grounding can be achieved via additional filtering techniques to block high frequency noise. Shielding is accomplished with ferrite layers behind or around the coils. This layer serves to prevent the coils from coupling to seat frame materials (metals) or other electronics, which would result in losses to the system in the form of heat.

Other features of the present invention include the ability to indicate that a device is wirelessly charging via a visual indicator. This prevents the occupant from having to directly check that charging has begun. Visual indicators used indicate the charging regions maybe in the form of a simple vinyl coating or pattern, LED perimeter lighting, a Light Pipe, which is a fiber optic cable lit by LEDs that allows light diffusion out radially from the pipe, or side lit clear or tinted acrylic with an etched pattern overlay so that light shines through it.

Haptic feedback is an additional notification system to ensure an occupant that the occupant's wireless device is charging. Haptic feedback can be integrated to the base of the tray by use of a vibrating DC motor which is activated when a mobile device begins charging. This allows non-visual confirmation that the mobile device wireless charging has begun. Through packaging optimization techniques, the footprint of the wireless charging integration system can be minimized to improve occupant comfort, reduce weight, and diminish negative impacts on vehicle seat styling and presentation. Seat packaging optimization techniques refer to the need to take into account thickness, support, safety, material stack-up and production feasibility between: the structure of the seat frame itself, the seat suspension to support the occupant during vertical loading or vibration (also known as jounce) when driving, cushion and backrest foam thickness, shape, and density to support the occupant, occupant detection systems, heater mats, cooling systems including 3D mesh materials to allow airflow, trim or seat covering materials with different backings and materials, and finally stitching or sew lines. These layers are specific to a vehicle package as specified by OEM, and would in turn be specific to a vehicle seat system. The wireless charging mechanism and system fits into the aforementioned material layers while not interfering with the structure (safety), seat suspension (support and comfort), foam (comfort), heater mats (thermal comfort), occupant detection systems (safety), cooling 3D mesh (thermal comfort), trim or stitching (esthetics and comfort).

The physical retention mechanism may be any type or combination of mechanisms to secure the device to the charging system. Additionally, the retention mechanism may help properly align the device to the charging system, and more specifically, to align the embedded transmitter coils of the wireless charging mechanism to the device's receiver coils. Depending on the type of retention mechanism used, the device may be automatically centered or aligned with respect to the charging system. Multiple retention mechanisms may be located within the charging system to secure, align, and charge multiple devices to one or more charging mechanisms. The retention mechanism may include, but is not limited to, one or more plastic housings, clips, straps, bungee cords, tethers, recessed cavities, spring-loaded arms or apertures, magnets, clamps, mechanical locking mechanisms, lips, or combinations thereof. The retention mechanism may be located along any or all sides, edges, and/or corners of the device. The retention mechanism may also provide safety mechanisms by safely securing and retaining the device in position in the event of a collision. The retention mechanism may prevent the device from becoming a projectile object within the vehicle.

The efficiency of a wireless charging system, or the effective power transferred to the mobile device, can be improved by reducing the distance between the wireless charging system and the mobile device where possible in the context of packaging within a seating assembly. Haptic indicators are DC motors that vibrate to indicate different charging scenarios to the user. The haptic indicators do not display information. The motors can be housed either in the plastics surrounding the wireless charging module, or within the seat cushion. Different pulse types can indicate when charging has begun, when the battery is full, or when charging has ended.

The physical attachment method of the mobile devices to the wireless charging integration system may include spring loaded armatures that press in on the devices corners or along its edges. The springs may be located in the channels leading up to the armatures. The methodology for the attachment method of mobile devices to the system is to correctly position the transmitter and receiver wireless charging coils.

A vacuum based adhesive method, such as that employed by Nanogrip and disclosed in US 2013/0251937 A1, can be used as an anti-slip coating in conjunction with the aforementioned mechanical spring loaded armatures. The entire contents of US 2013/0251937 A1 are incorporated herein by reference. This type of anti-slip coating is not limited to Nanogrip, but may also employ a rubber surface or textured thermoplastic polyurethane (TPU) to prevent movement. This adhesive method includes an indicator to show proper placement (and orientation in the case of tightly coupled induction) of the mobile device's receiver coils to the embedded transmitter coils in the system. This indicator may be in the form of an outline, shaded area, or a lighted area to show the effective region of wireless power transmission.

A swivel can also be used as a powered docking point for the mobile version of the tray. The connector that protrudes into the base of the tray will include power and ground connections, and can be made modular to allow the decoupling of the tray from the cushion. The connector may have a two wire connection for power and ground, which can take a variety of forms in modern electronics. Several types of connectors can be used to fulfill the seat packaging optimization requirements. One example of the connection that allows decoupling of the tray from the cushion is in the form of a male and female style DC connector plug, as used in a laptop or other electronic devices. There may be no cable, only the male and female connectors, with one of them being integrated directly into the plastic housing or dock, and the other being integrated into the removable tray plastics. These connections may not be structural meaning that they may not be designed to support connection itself, and another mechanical means may be required to ensure the connection is secured and locked properly.

According to the present invention, the charging integration system comprises a seat structure, a charging system carrier pivotably connected to the seat structure and a charging station structure movably connected to the charging system carrier.

The charging system carrier may be movable between a first carrier position and a second carrier position. The charging station structure may be movable from at least a first charging station structure position to a second charging station structure position with the charging system carrier in the second carrier position.

The seat structure may comprise a backrest structure. The charging station structure may face in a direction of the backrest structure in the second carrier position.

The seat structure may comprise a first seat and a second seat. The seat structure may comprise a third seat with the charging system carrier in the first carrier position. The third seat may comprise a backrest structure and a seat rest structure. The seat rest structure may have an occupant leg engaging surface for engaging at least a leg portion of an occupant. The charging system carrier may comprise an outer trim surface. The outer trim surface may define a seat rest surface of the seat rest structure with the charging system carrier in the first carrier position.

The charging carrier system may comprise a first track and a second track. The charging station structure may be movably connected to the first track and the second track such that the charging station structure moves in a vertical direction, relative to the first rail and the second rail, with the charging system carrier in the second carrier position. The vertical direction may be parallel to the first track and the second track.

The charging station structure may comprise a friction, anti-slip coating. The friction, anti-slip coating may define an outer surface of the charging station structure.

The charging station structure may comprise a plastic electronics housing and one of device retention clips and a recessed cavity. The anti-slip coating and one of the device retention clips and the recessed cavity may secure one or more devices connected to the charging station structure with the charging system carrier in the second carrier position.

Each of the one or more devices may comprise a rechargeable power source. The charging station structure may comprise transmitter coils, circuitry and at least one battery. Power may be wirelessly transmitted from the at least battery to the one or more devices via the transmitter coils and the circuitry with the one or more devices connected to the charging station structure and with the charging system carrier in the second carrier position.

The charging station structure may comprise a layer of ferrite.

The charging station structure may comprise a thermal mitigation layer. The thermal mitigation layer may comprise a heat sink The heat sink may remove heat produced by the transmitter coils.

The charging system carrier may comprise a first seat structure connecting structure and a second seat structure connecting structure. The charging station structure may be pivotably connected to the first seat structure connecting structure and the second seat structure connecting structure such that the charging station structure is pivotable from the first charging station structure position to the second charging station structure position with the charging system carrier in the second carrier position.

The charging station structure may be located in an interior of the charging system carrier with the charging system carrier in the first carrier position and with the charging station structure in the first charging station structure position. At least a portion of the charging station structure may be located at a position outside of the charging system carrier with the charging system carrier in the second carrier position and with the charging station structure in the second charging station structure position.

The charging station structure may comprise a base portion and a device mounting portion. The base portion may be pivotably connected to the first seat structure connecting structure and the second seat structure connecting structure. The device mounting portion may be rotatably connected to the base portion. The device mounting portion may be rotatable relative to the base portion with the charging station structure in the second charging station structure position and with the charging system carrier in the second carrier position.

The charging system carrier may comprise foam.

The seat structure may comprise a storage compartment and at least one cup holder. The storage compartment and the at least one cup holder may be accessible with the charging system carrier in the second carrier position.

The charging station structure may comprise one of a tray and an armature.

The one or more devices may comprise at least one of a tablet, a mobile phone and a smartphone. The charging station structure may comprise a display. The display may provide a visual indicator as output. The visual indicator may correspond to a recharging status of the one or more devices.

The charging station structure may comprise one or more universal serial bus (USB) powered ports. Power may be supplied to the one or more devices via a physical connection. The physical connection may connect one of the one or more devices to one of the one or more USB ports.

The seat structure may be a second row seat structure of a vehicle.

According to the present invention, a vehicle seat system comprises a seat structure comprising a first seat and a second seat. A charging system support structure is pivotably connected to the seat structure such that the charging system support structure is movable between a closed position and an open position. The charging system support structure defines a seat surface of a third seat of the seat structure in the closed position. A charging station system is movably connected to the charging system support structure such that the charging station system is movable, relative to the charging system support structure, with the charging system support structure in the open position.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
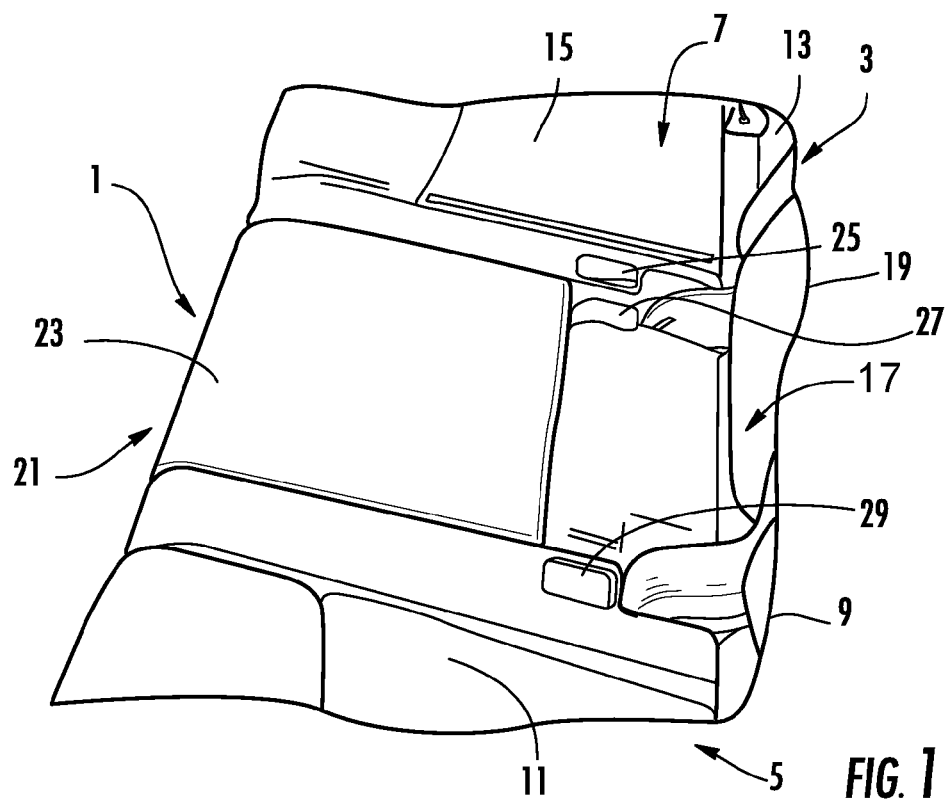
FIG. 1 is a partial view of a charging integration system of the present invention in a first position.

Referring to the drawings in particular, FIG. 1 shows a charging integration system 1 pivotably connected to a vehicle seat structure 3. The vehicle seat structure 3 includes a first seat 5 and a second seat 7. The first seat 5 has a backrest structure 9 for engaging at least a lumbar region of a first occupant and a seat rest structure 11 for engaging the buttocks and at least a portion of the legs of the first occupant. The backrest structure 9 may be pivotably connected to the seat rest structure 11 such that the backrest structure 9 is movable relative to the seat rest structure 11. The second seat 7 has a backrest structure 13 for engaging at least a lumbar region of a second occupant and a seat rest structure 15 for engaging the buttocks and at least a portion of the legs of the second occupant. The backrest structure 13 may be pivotably connected to the seat rest structure 15 such that the backrest structure 13 is movable relative to the seat rest structure 15. The charging integration system 1 forms a portion of a third seat 17 when the charging integration system 1 is in a folded position. The third seat 17 includes a backrest structure 19 for engaging at least a lumbar region of a third occupant and a seat rest structure 21 for engaging the buttocks and at least a leg portion of the third occupant when the charging integration system 1 is in the folded position. The backrest structure 19 may be pivotably connected to the seat rest structure 21 such that the backrest structure 19 is movable relative to the seat rest structure 21. The charging integration system 1 forms at least a portion of a seat surface 23 of the seat rest structure 21 in the folded position. An occupant of the vehicle can sit on the seat surface 23 when the charging integration system 1 is in the folded position. Seat belt retaining structures 25, 27, 29 are provided for receiving and retaining a seatbelt securing element. The charging integration system 1 is arranged adjacent to the first seat 5 and the second seat 7 when the charging integration system 1 is in the folded position.

Figure 2:
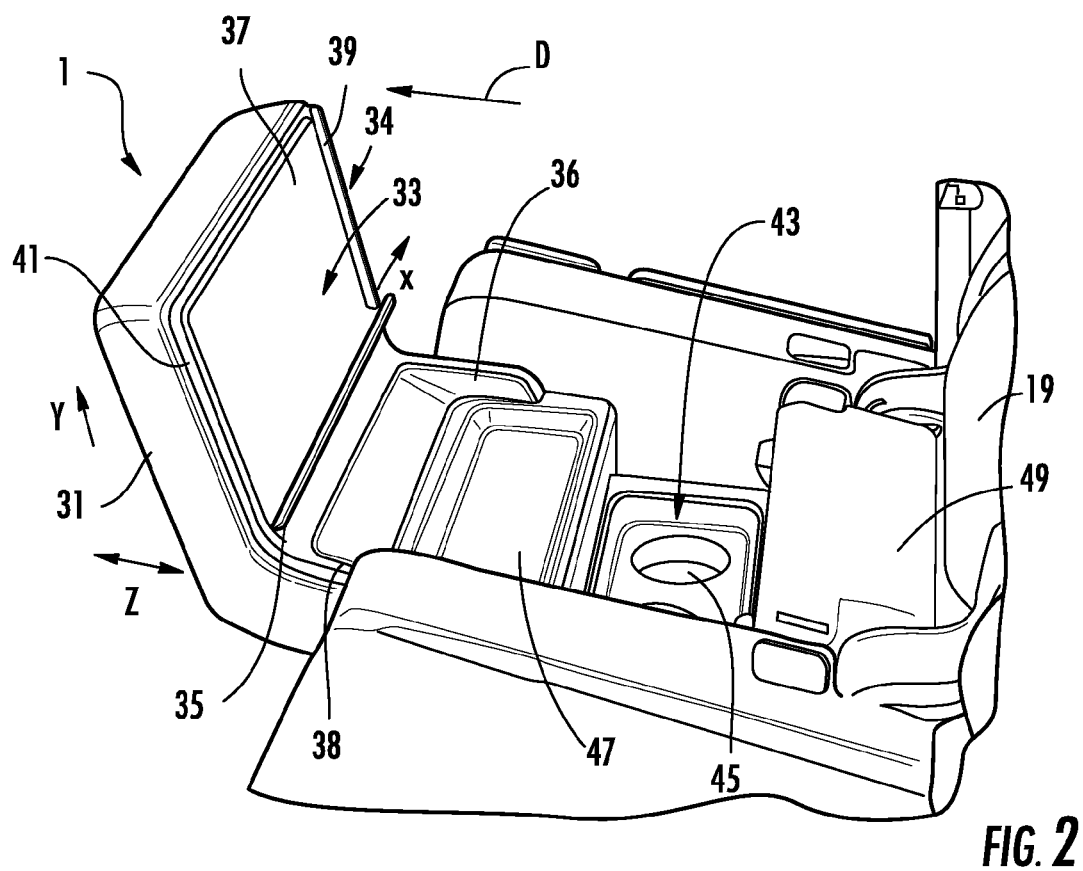
FIG. 2 is a partial view of the charging integration system of FIG. 1 in a second position.

FIG. 2 shows the charging integration system 1 in an unfolded position wherein the charging integration system 1 has been pivoted in a direction away from the backrest structure 19 and the charging integration system 1 is moved in a traveling direction D of the vehicle. The charging integration system 1 includes trim material 31. The trim material 31 may be leather, vinyl, cloth or a combination thereof. The trim material 31 defines the seat surface 23 when the charging integration system 1 is in the folded position. The charging integration system 1 includes a charging station structure 33, which may be in the form a tray or an armature. The charging station structure 33 is capable of providing wireless power to one or more devices that are connected to the charging station structure 33. The charging station structure 33 includes a device holding raised lip or bent portion 35 that is bent in an upward direction. The charging station structure 33 includes a high friction, anti-slip layer or coating 37, a plastic electronic housing and device retention clips or recessed cavity or cavities, transmitter coils, a layer containing ferrite and a thermal mitigation layer. The high friction, anti-slip layer or coating 37 forms a grip mat to grip one or more components or devices, such as mobile devices, smartphones and tablets, so that the one or more components or devices do not move when the components are connected to the charging station structure 33. The high friction, anti-slip layer or coating 37 faces opposite the backrest structure 19 when the charging integration system 1 is in the unfolded position. The high friction, anti-slip layer or coating 37 prevents movement of the components in the X direction and the Y direction so that the components are maintained in the proper orientation above the charging coils. The X, Y and Z directions are shown in FIG. 2. The charging station structure 33 includes USB powered ports. The USB powered ports allow one or more devices or components, which cannot be charged wirelessly, to be charged by a physical connector that connects one of the one or more devices or components to one of the USB powered ports. The plastic electronic housing and device retention clips or cavity or cavities prevent movement of the components in the Z direction and secure the components to the charging station structure 33. The transmitter coils drive one or more circuits and one or more batteries to transfer wireless power to the one or more devices or components. The layer containing ferrite prevents metallic losses in the seat frame assembly. The thermal mitigation layer can employ either passive or active cooling via heatsinks to remove heat produced by the transmitter coils.

The charging integration system 1 includes a carrier 34. The carrier 34 includes rails or tracks 39, 41, a seat structure connecting structure 36 and another seat structure connecting structure 38. The seat structure connecting structure 36 and the another seat structure connecting structure 38 are pivotably connected to the seat structure 3. The charging station structure 33 is movable in a vertical direction along the rails or tracks 39, 41 to adjust a vertical viewing height of components or devices mounted to the high friction, anti-slip layer or coating 37. Power is wirelessly transmitted to the components or devices when the components or devices are mounted to the high friction, anti-slip layer or coating 37. With the charging integration system 1 in the unfolded position, an occupant is able to access a cup holder structure 43 and a storage compartment 47. The cup holder structure 43 includes a recess 45 for holding or retaining a cup. The cup holder structure 43 is located at a position that is lower than the position of the storage compartment 47. The storage compartment 47 and the cup holder structure 45 may be located at a position that is lower than a surface 49 of the seat rest structure 21.

Figure 3:
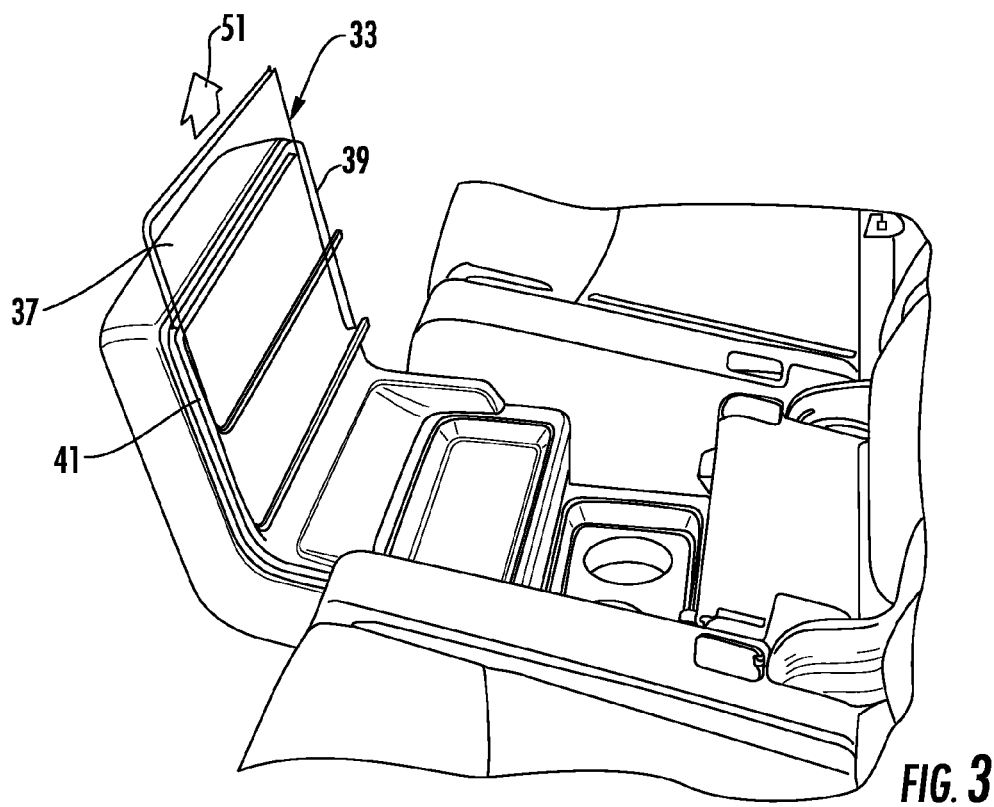
FIG. 3 is a partial view of the charging integration system of FIG. 2 showing movement of a charging station of the system in an upward direction.

FIG. 3 shows the charging station structure 33 moved in a vertical direction 51 from a first position to a second position along the tracks or rails 39, 41 to adjust the vertical viewing height of components or devices mounted to the high friction, anti-slip layer or coating 37 while the power source of at least one device is charged. This allows an occupant to adjust the viewing height of the components so that the occupant can view the components or devices while the components or devices are wirelessly charged.

Figure 4:
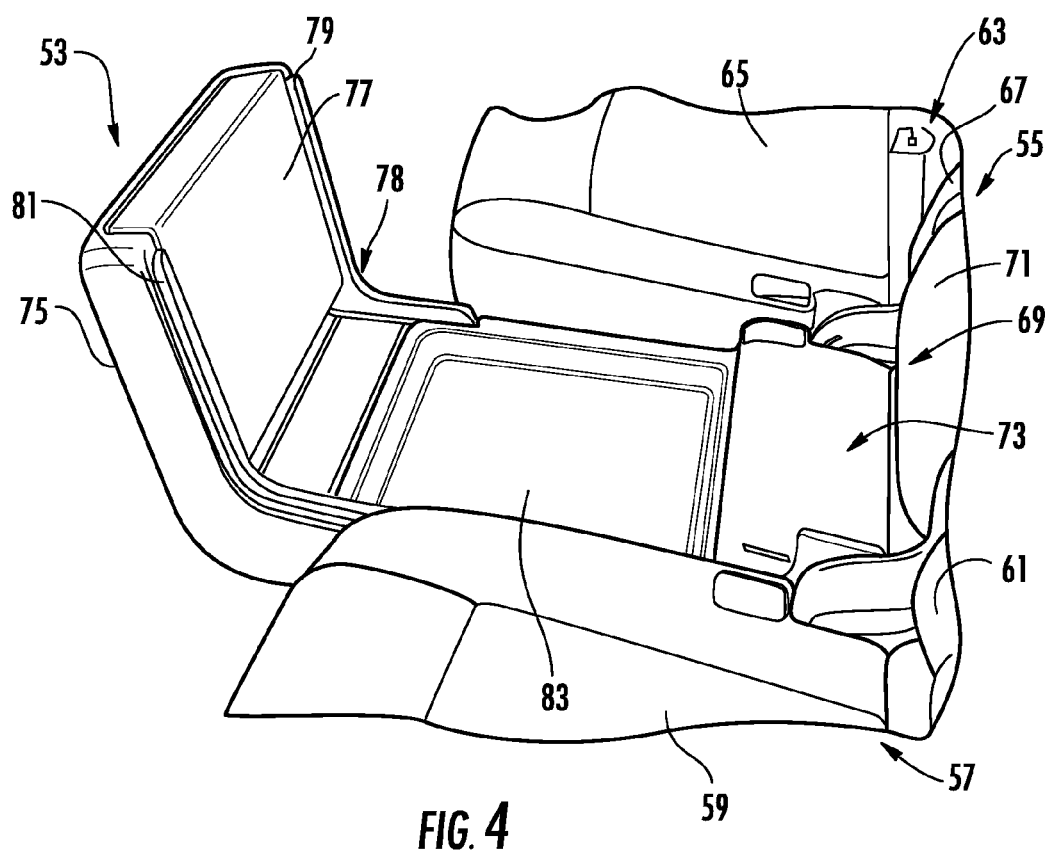
FIG. 4 is a partial view of another embodiment of a charging station of a charging integration system in a first position.
Figure 5:
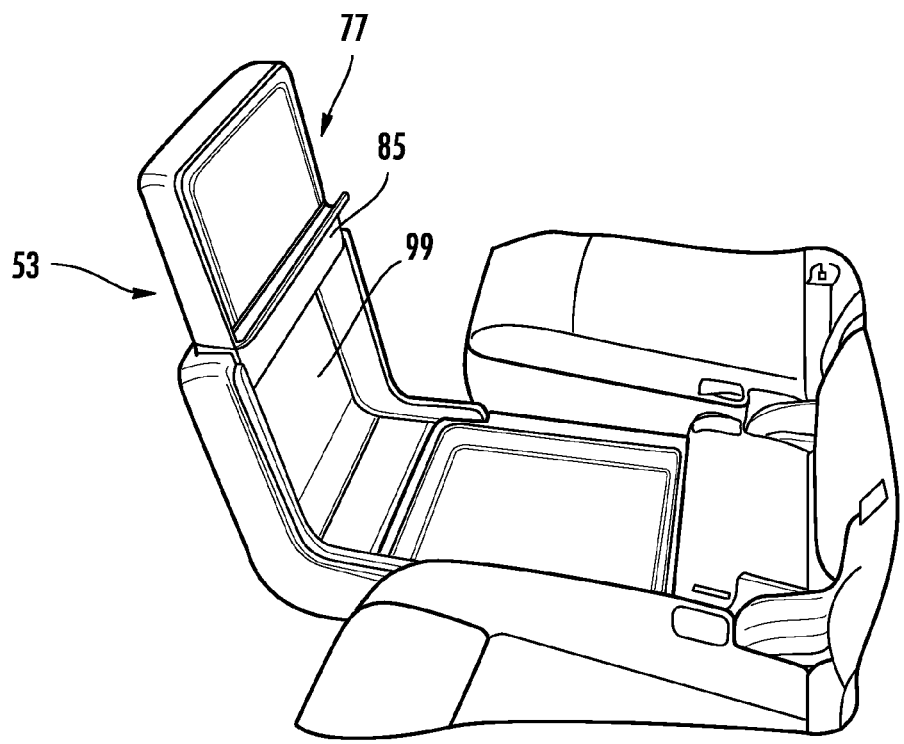
FIG. 5 is a partial view of the charging station of FIG. 4 in a second position.

FIG. 4 shows another embodiment of a charging integration system 53 that is pivotably connected to a seat structure 55 such that the charging integration system 53 is movable between a first position or folded position and a second position or unfolded position. The seat structure 55 includes a first seat structure 57 and a second seat structure 63. The first seat structure 57 includes a backrest structure 61 and a seat rest structure 59. The backrest structure 61 supports at least a first occupant's lumbar region and the seat rest structure 59 supports the first occupant's buttocks and at least a leg portion of the first occupant. The second seat structure 63 includes a backrest structure 67 and a seat rest structure 65. The backrest structure 67 supports at least a second occupant's lumbar region and the seat rest structure 65 supports the second occupant's buttocks and at least a leg portion of the second occupant. With the charging integration system 53 in the first position or folded position, an outer surface 75 defines at least a portion of a seat rest structure 73 of a third seat structure 69 of the seat structure 55 for supporting the buttocks and a leg portion of a third occupant. The third seat structure 69 includes a backrest structure 71 for supporting at least a lumbar region of the third occupant when the charging integration system 53 is in the first position or folded position. The outer surface 75 is defined by the trim of the charging integration system 53. The charging integration system 53 includes a charging station structure 77, which may be in the form of a tray or armature. The charging station structure 77 is pivotably connected to a carrier 78 such that the charging station structure 77 is movable from a closed position (FIG. 4) to an open position (FIG. 5) when the charging integration system 53 is in a second position or unfolded position. The device holding raised lip or bent portion 35 can be embodied in FIG. 4 with the device holding raised lip or bent portion 35 being connected to the charging station structure 77. This is so that devices can be charged from the initial down position as well (before being rotated upward), which is similar to that which is shown in FIG. 2. The carrier 78 includes a frame portion 79 and another frame portion 81 that are pivotably connected to the seat structure 55 via a pivotable connection. The charging station structure 77 is arranged in a charging station structure receiving opening 99 in the closed position (see FIG. 5). The charging station structure 77 pivots 180° from the closed position (FIG. 4) to the open position (FIG. 5). With the charging integration system 53 in the second position or unfolded position, an occupant is able to access a storage compartment 83.

Figure 6:
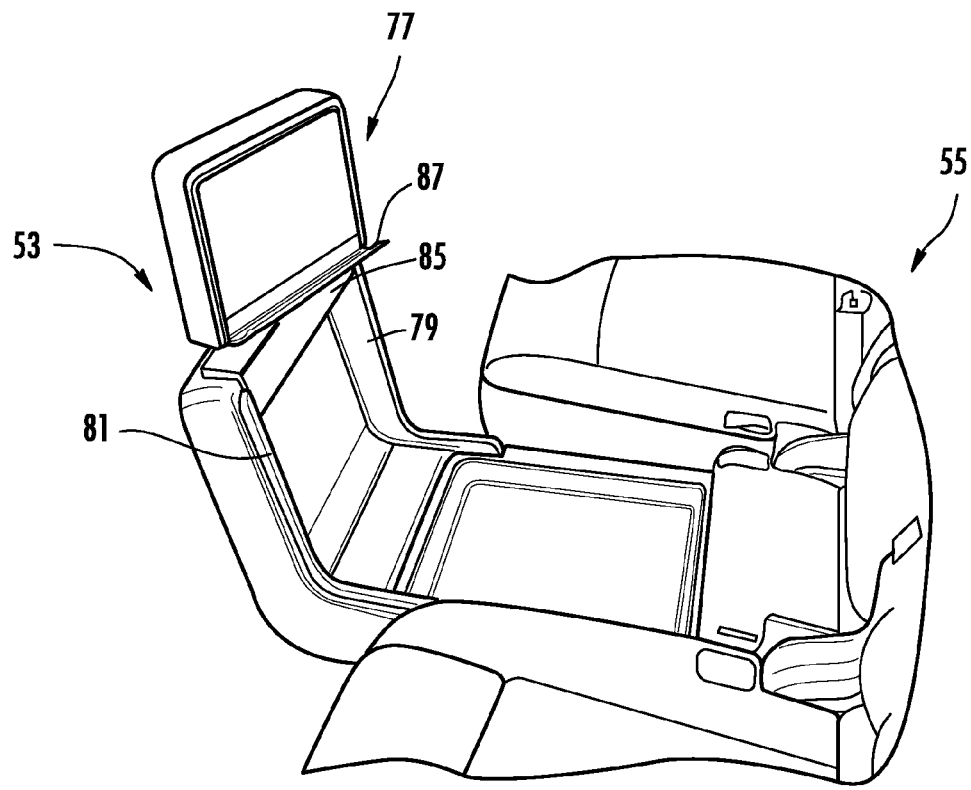
FIG. 6 is a partial view of the charging integration system of FIG. 5 with the charging station rotated about an axis thereof.

FIG. 5 shows the charging station structure 77 in the open position with the charging integration system 53 in the open position. The charging station structure 77 is pivotably connected to a base portion 85 via a pivotable connection such that the charging station structure 77 can rotate left and right, relative to the base portion 85, to adjust the viewing angle of the charging station structure 77 (FIG. 6). The base portion 85 is pivotably connected via a pivotable connection to the frame portion 79 and the another frame portion 81. The charging station structure 77 includes a device holding raised lip or bent portion 87. When one or more devices or components, such as smartphones, mobile cellular devices and tablets, are connected to the charging station structure 77, the one or more devices or components is charged with power supplied from the charging station structure 77.

Figure 7:
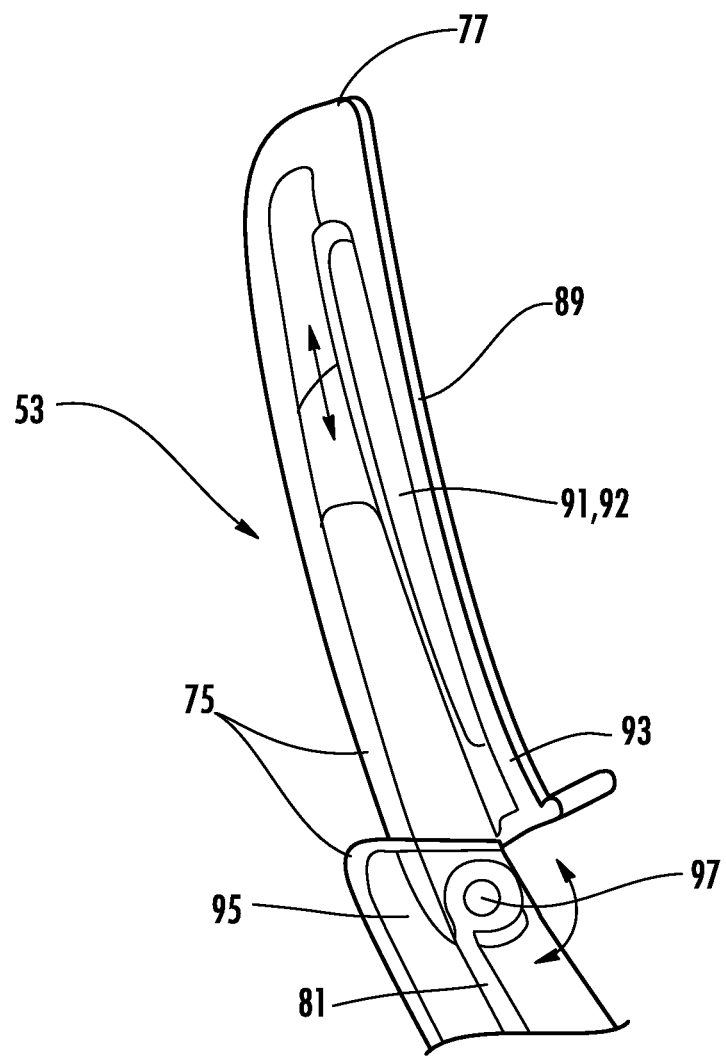
FIG. 7 is a partial cross sectional view of the charging integration system of FIG. 6.

FIG. 7 shows a cross sectional view of the charging integration system 53. The charging station structure 77 includes a high friction anti slip layer or coating 89, which forms a grip mat to grip a surface of one or more of the devices or components to prevent movement of the one or more devices or components in the X/Y direction when the components or devices are connected to the charging station structure 77. Wireless charging of the one or more components or devices may occur when the one or more components or devices come in direct contact with the charging station structure 77. The charging station structure 77 includes a plastic electronics housing 93, which includes retention clips 119 or recessed cavity or cavities to prevent movement of the devices or components in the Z direction and secure them to the charging station structure 77 (see FIG. 13). The charging station structure 77 includes coils 92 and a printed circuit board 91. The charging station structure 77 is pivotably connected to the frame portion 81 via a pivotable connection. The charging station structure 77 and the frame portion 81 define a pivot 97. The charging integration system 53 includes a foam structure 95 that is connected to the trim 75. The charging station structure 77 includes USB powered ports, which allow one or more devices or components to be charged via a physical connection, such as a wire, wires, cable or cables, that connects the one or more devices or components to the charging station structure 77. The USB powered ports supply power to one or more devices or components that cannot be charged wirelessly. The charging integration system 1 shown in FIGS. 1-3 includes the features shown in FIG. 7 except for the pivot 97.

Figure 8:
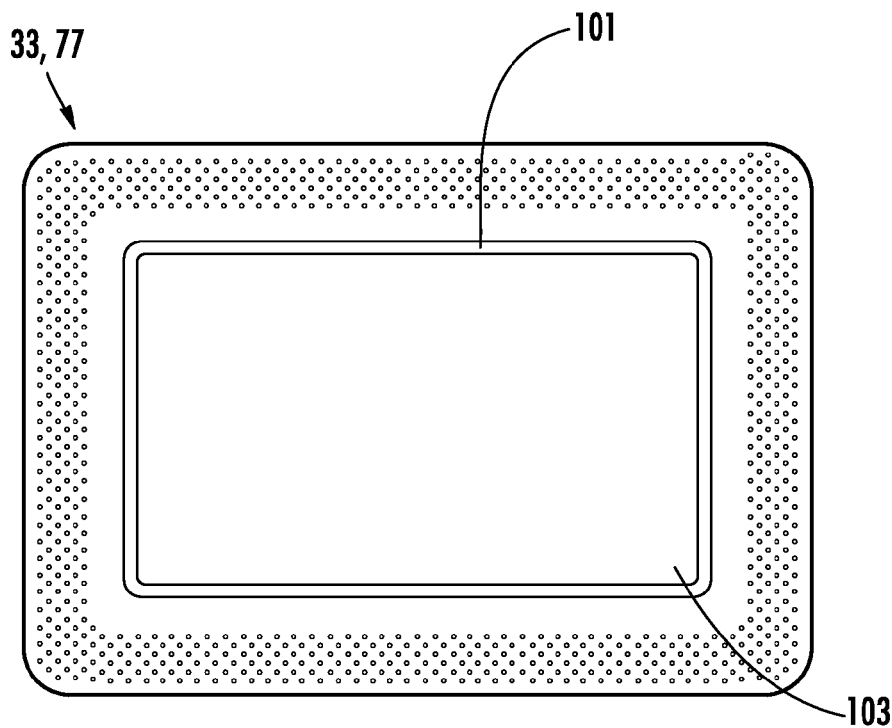
FIG. 8 is a front view of a charging station structure with a visual indicator.

FIG. 8 shows a visual indicator 101 for the charging station structure 33 or the charging station structure 77. The visual indicator 101 may be a single fiber optic cable that is lit by LEDs that allow light diffusion radially from the fiber optic cable or side lit clear or tinted acrylic with an etched pattern overlay so that light shines through it. The blue color shown can be any color or multiple colors. The interior of the visual indicator 101 defines a charging region 103.

Figure 9:
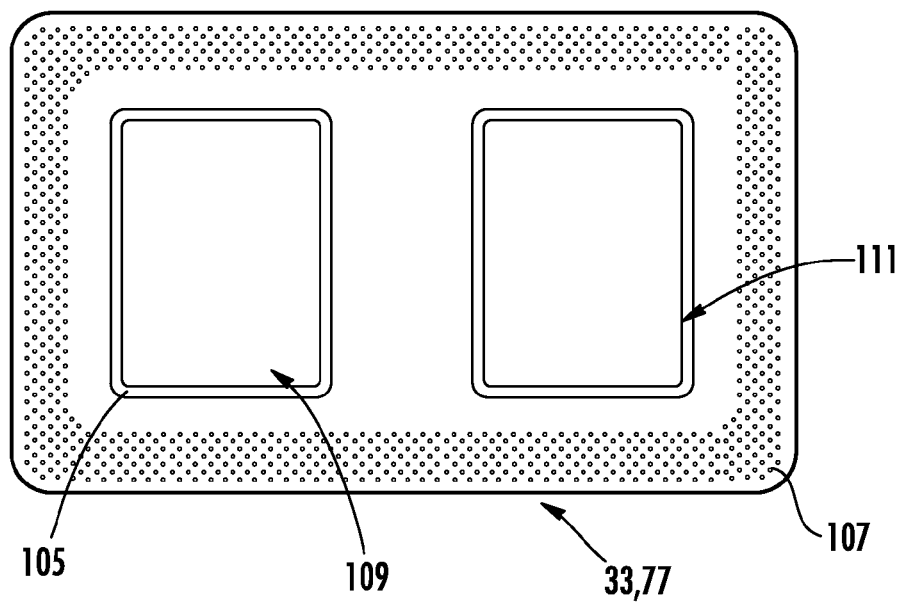
FIG. 9 is a front view of a charging station structure with two visual indicators.

FIG. 9 shows two visual indicators 105, 107 for the charging station structure 33 or the charging station structure 77. One visual indicator 105 defines one charging region 109, which is defined in the interior of the visual indicator 105. Another visual indicator 107 defines another charging region 111, which is defined in the interior of the visual indicator 107. Each of the visual indicators 105, 107 may be a single fiber optic cable that is lit by LEDs that allow light diffusion radially from the fiber optic cable or side lit clear or tinted acrylic with an etched pattern overlay so that light shines through it. The blue color shown can be any color or multiple colors.

Figure 10:
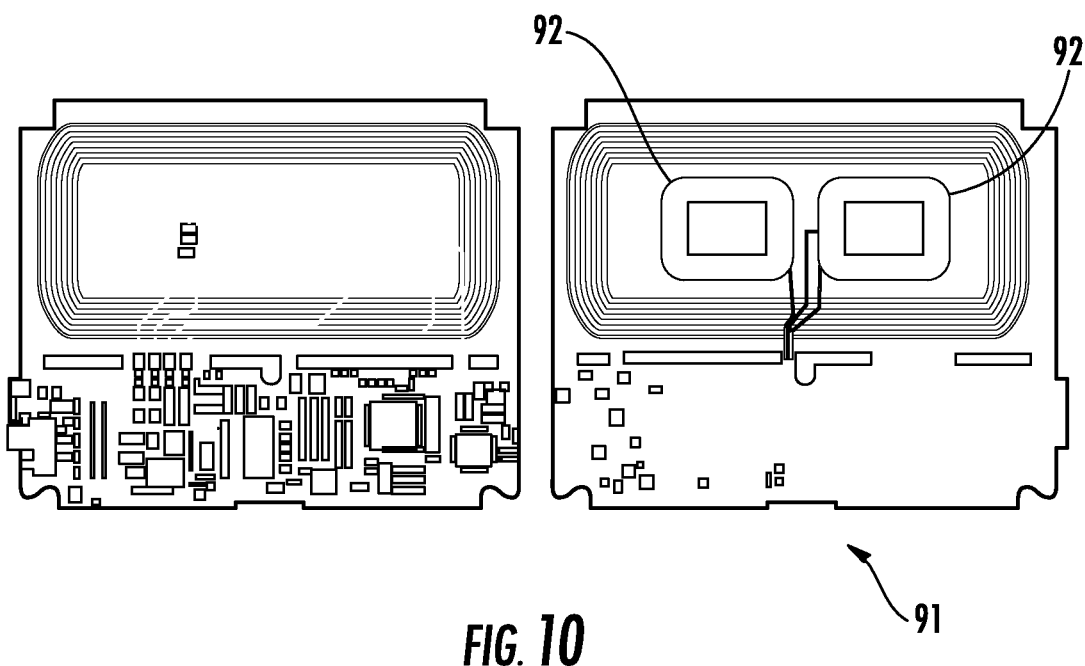
FIG. 10 is a view of one embodiment of the coils and the printed circuit of a charging integration system.

FIG. 10 shows one embodiment of the coils 92 and the printed circuit board 91 that is connected to the charging integration system 1 or the charging integration system 77. The coils 92 are integrated directly into the printed circuit board 91.

Figure 11:
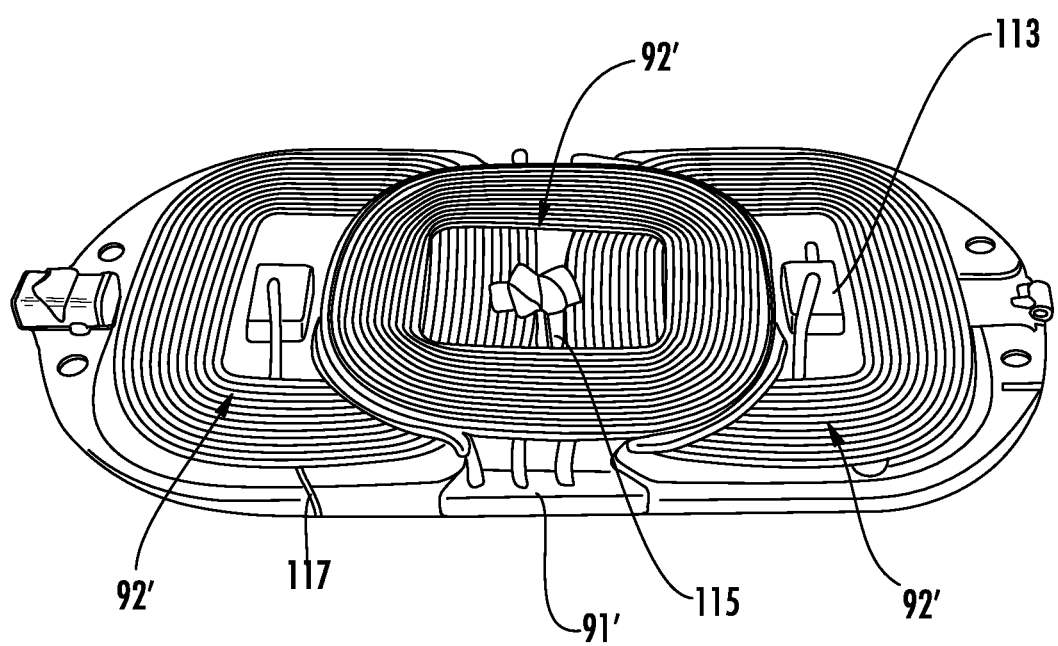
FIG. 11 is a view of another embodiment of the coils and the printed circuit of a charging integration system.

FIG. 11 shows another embodiment of the coils and the printed circuit board for connection to the charging integration system 1 or the charging integration system 77. Coils 92' are provided on top of the printed circuit board 91' and soldered on to the circuit board 91' via wires 113, 115 and 117.

Figure 12:
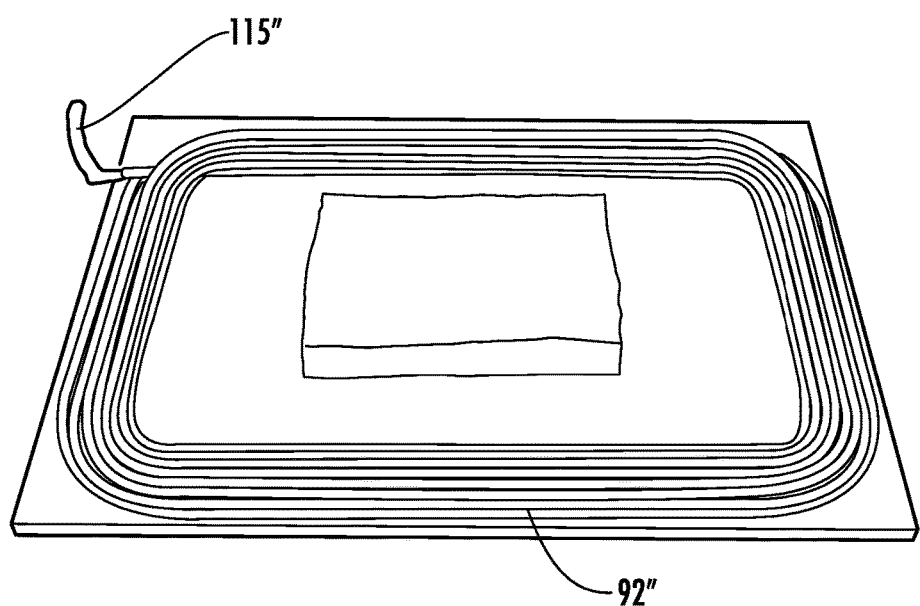
FIG. 12 is a view of yet another embodiment of the coils and the printed circuit of a charging integration system.

FIG. 12 shows yet another embodiment of the coils and the printed circuit board for connection to the charging integration system 1 or the charging integration system 77. The coils 92" are remotely oriented and separate from the printed circuit board itself, but still requires a soldered connection via wire 115" to the printed circuit board.

Figure 13:
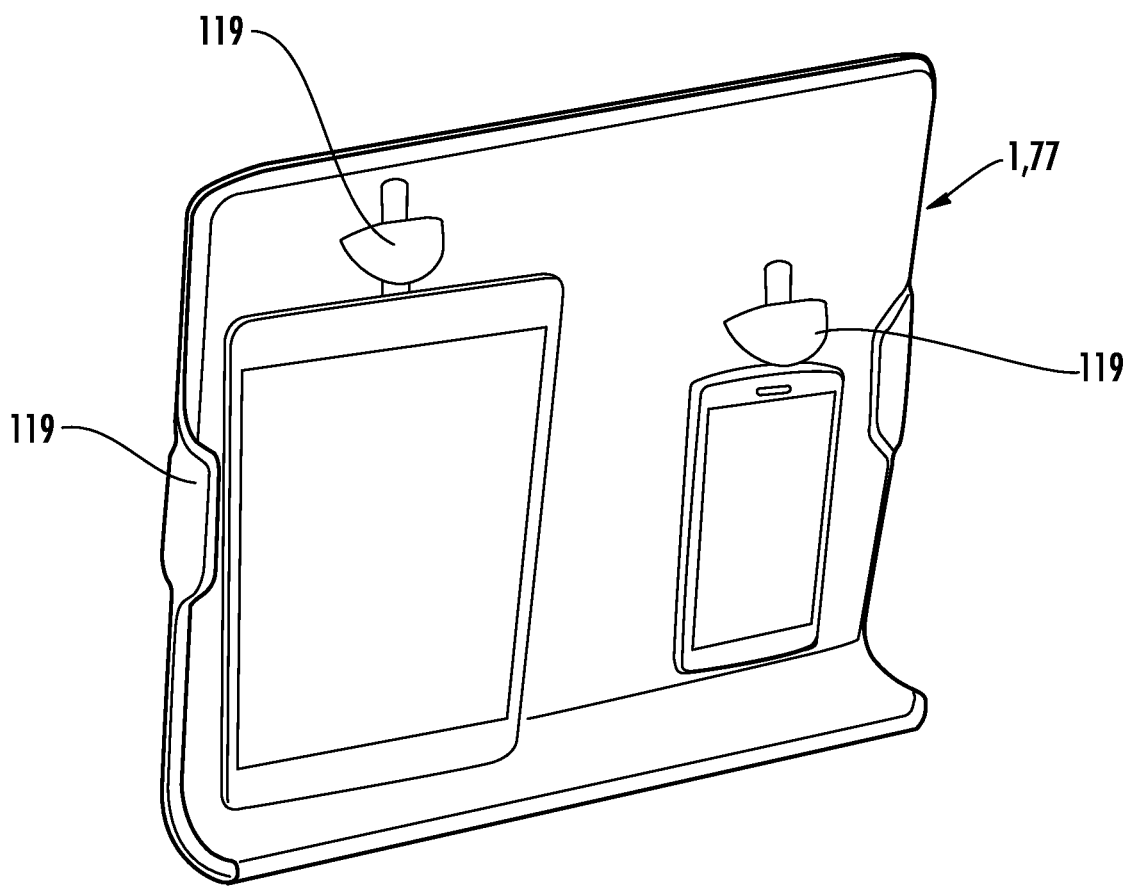
FIG. 13 is a view of a charging integration system having a plurality of clips.

FIG. 13 shows a view of clips 119 of the charging integration system 1 or the charging integration system 77.

The clips 119 may extend out from the corners of the device charging region on a 45 degree angle.

While specific embodiments of the invention have been shown and described in detail to illustrate the application of the principles of the invention, it will be understood that the invention may be embodied otherwise without departing from such principles.

The invention claimed is:

1. A charging integration system, comprising:
a seat structure;
a charging system carrier pivotably connected to said seat structure such that said charging system carrier is movable at least between a first carrier position and a second carrier position, said charging system carrier defining at least a portion of a seat rest surface of a seat rest structure of said seat structure in said first carrier position; and
a charging station structure movably connected to said charging system carrier, said charging station structure comprising a friction, anti-slip coating, said friction, anti-slip coating defining an outer surface of said charging station structure, said charging station structure comprising a plastic electronics housing and one of device retention clips and a recessed cavity, said anti-slip coating and said one of device retention clips and said recessed cavity securing one or more devices connected to said charging station structure with said charging system carrier in said second carrier position.

2. A charging integration system in accordance with claim 1, wherein said charging station structure is movable from at least a first charging station structure position to a second charging station structure position with said charging system carrier in said second carrier position.

3. A charging integration system in accordance with claim 2, wherein said seat structure comprises a backrest structure, said charging station structure facing in a direction of said backrest structure in said second carrier position.

4. A charging integration system in accordance with claim 2, wherein said seat structure comprises a first seat and a second seat, said seat structure comprising a third seat with said charging system carrier in said first carrier position, said third seat comprising a backrest structure and said seat rest structure, said seat rest structure having an occupant leg engaging surface for engaging at least a leg portion of an occupant, said charging system carrier comprising an outer trim surface, said outer trim surface defining said portion of said seat rest surface of said seat rest structure with said charging system carrier in said first carrier position.

5. A charging integration system in accordance with claim 2, wherein said charging carrier system comprises a first track and a second track, said charging station structure being movably connected to said first track and said second track such that said charging station structure moves in a vertical direction, relative to said first track and said second track, with said charging system carrier in said second carrier position, said vertical direction being parallel to said first track and said second track.

6. A charging integration system in accordance with claim 1, wherein each of said one or more devices comprises a rechargeable power source, said charging station structure comprising transmitter coils, circuitry and at least one battery, wherein power is wirelessly transmitted from said at least one battery to the one or more devices via said transmitter coils and said circuitry with the one or more devices connected to the charging station structure and with said charging system carrier in said second carrier position.

7. A charging integration system in accordance with claim 6, wherein said charging station structure comprises a layer of ferrite.

8. A charging integration system in accordance with claim 7, wherein said charging station structure comprises a thermal mitigation layer, said thermal mitigation layer comprising a heat sink, said heat sink removing heat produced by said transmitter coils.

9. A charging integration system in accordance with claim 2, wherein said charging system carrier comprises a first seat structure connecting structure and a second seat structure connecting structure, said charging station structure being pivotably connected to said first seat structure connecting structure and said second seat structure connecting structure such that charging station structure is pivotable from said first charging station structure position to said second charging station structure position with said charging system carrier in said second carrier position.

10. A charging integration system in accordance with claim 9, wherein said charging station structure is located in an interior of said charging system carrier with said charging system carrier in said first carrier position and with said charging station structure in said first charging station structure position, at least a portion of said charging station structure being located at a position outside of said charging system carrier with said charging system carrier in said second carrier position and with said charging station structure in said second charging station structure position.

11. A charging integration system in accordance with claim 9, wherein said charging station structure comprises a base portion and a device mounting portion, said base portion being pivotably connected to said first seat structure connecting structure and said second seat structure connecting structure, said device mounting portion being rotatably connected to said base portion, wherein said device mounting portion is rotatable relative to said base portion with said charging station structure in said second charging station structure position and with said charging system carrier in said second carrier position.

12. A charging integration system in accordance with claim 4, wherein said charging system carrier comprises foam.

13. A charging integration system in accordance with claim 2, wherein said seat structure comprises a storage compartment and at least one cup holder, said storage compartment and said at least one cup holder being accessible with said charging system carrier in said second carrier position.

14. A charging integration system in accordance with claim 1, wherein said charging station structure comprises one of a tray and an armature.

15. A charging integration system in accordance with claim 1, wherein said one or more devices comprise at least one of a tablet, a mobile phone and a smartphone, said charging station structure comprising a display, said display providing a visual indicator as output, said visual indicator corresponding to a recharging status of said one or more devices.

16. A charging integration system in accordance with claim 6, wherein said charging station structure comprises one or more universal serial bus (USB) powered ports, wherein power is supplied to said one or more devices via a physical connection, said physical connection connecting one of said one or more devices to one of said one or more USB ports.

17. A charging integration system in accordance with claim 1, wherein said seat structure is a second row seat structure of a vehicle.

18. A charging integration system, comprising:
a seat structure;
a charging system carrier pivotably connected to said seat structure such that said charging system carrier is movable at least between a first carrier position and a second carrier position, said charging system carrier defining at least a portion of a seat rest surface of a seat rest structure of said seat structure in said first carrier position; and
a charging station structure movably connected to said charging system carrier, said charging station structure being movable from at least a first charging station structure position to a second charging station structure position with said charging system carrier in said second carrier position, said charging system carrier comprising a first seat structure connecting structure and a second seat structure connecting structure, said charging station structure being pivotably connected to said first seat structure connecting structure and said second seat structure connecting structure such that charging station structure is pivotable from said first charging station structure position to said second charging station structure position with said charging system carrier in said second carrier position, said charging station structure being located in an interior of said charging system carrier with said charging system carrier in said first carrier position and with said charging station structure in said first charging station structure position, at least a portion of said charging station structure being located at a position outside of said charging system carrier with said charging system carrier in said second carrier position and with said charging station structure in said second charging station structure position.

19. A charging integration system, comprising:
a seat structure;
a charging system carrier pivotably connected to said seat structure such that said charging system carrier is movable at least between a first carrier position and a second carrier position, said charging system carrier defining at least a portion of a seat rest surface of a seat rest structure of said seat structure in said first carrier position; and
a charging station structure movably connected to said charging system carrier, said charging station structure being movable from at least a first charging station structure position to a second charging station structure position with said charging system carrier in said second carrier position, said charging system carrier comprising a first seat structure connecting structure and a second seat structure connecting structure, said charging station structure being pivotably connected to said first seat structure connecting structure and said second seat structure connecting structure such that charging station structure is pivotable from said first charging station structure position to said second charging station structure position with said charging system carrier in said second carrier position, said charging station structure comprising a base portion and a device mounting portion, said base portion being pivotably connected to said first seat structure connecting structure and said second seat structure connecting structure, said device mounting portion being rotatably connected to said base portion, wherein said device mounting portion is rotatable relative to said base portion with said charging station structure in said second charging station structure position and with said charging system carrier in said second carrier position.

* * * * *

UNITED STATES PATENT AND TRADEMARK OFFICE
CERTIFICATE OF CORRECTION

PATENT NO. : 10,286,862 B2
APPLICATION NO. : 15/037570
DATED : May 14, 2019
INVENTOR(S) : Pike et al.

Page 1 of 1

It is certified that error appears in the above-identified patent and that said Letters Patent is hereby corrected as shown below:

On the Title Page

(71) Applicant should read: Adient Luxembourg Holding S.à r.l.

(73) Assignee should read: Adient Luxembourg Holding S.à r.l.

Signed and Sealed this
Sixteenth Day of July, 2019

Andrei Iancu
*Director of the United States Patent and Trademark Office*